(12) United States Patent  
Hammond et al.

(10) Patent No.: US 7,402,100 B2
(45) Date of Patent: Jul. 22, 2008

(54) HAND HELD ELECTRICAL DEVICE AND METHOD FOR USING THE SAME

(75) Inventors: Michael Hammond, Madison, WI (US); Kevin D. Brase, Corinth, TX (US)

(73) Assignee: Mattel, Inc., El Segundo, CA (US)

( * ) Notice: Subject to any disclaimer, the term of this patent is extended or adjusted under 35 U.S.C. 154(b) by 509 days.

(21) Appl. No.: 10/689,516

(22) Filed: Oct. 21, 2003

(65) Prior Publication Data

US 2005/0085301 A1   Apr. 21, 2005

(51) Int. Cl.
*G06F 17/00* (2006.01)
(52) U.S. Cl. ........................................ 463/16
(58) Field of Classification Search .................. 463/43, 463/44, 45, 46, 16–20, 25–29
See application file for complete search history.

(56) References Cited

U.S. PATENT DOCUMENTS

| | | | |
|---|---|---|---|
| 4,359,222 A * | 11/1982 | Smith et al. | 463/31 |
| 4,593,376 A | 6/1986 | Volk | |
| 6,042,478 A | 3/2000 | Ng | |
| 6,810,463 B2 * | 10/2004 | Okada et al. | 711/115 |
| 2006/0148568 A1 * | 7/2006 | Schultz et al. | 463/42 |

* cited by examiner

*Primary Examiner*—Ronald Laneau
(74) *Attorney, Agent, or Firm*—Bell, Boyd & Lloyd

(57) ABSTRACT

A hand held electronic device that includes a main body with a connector adapted to electrically and mechanically connect the main body to an electronic game separate from the device, and a method for using the same. First and second ports of the main body are sized to receive first and second game cartridges of the electronic game, respectively. Each of the first and second ports have an electrical connection that is electrically connectable to the respective first and second game cartridges. The device includes a processor adapted to electrically connect the electronic game to the first and second game cartridges through the first and second ports of the main body.

32 Claims, 5 Drawing Sheets

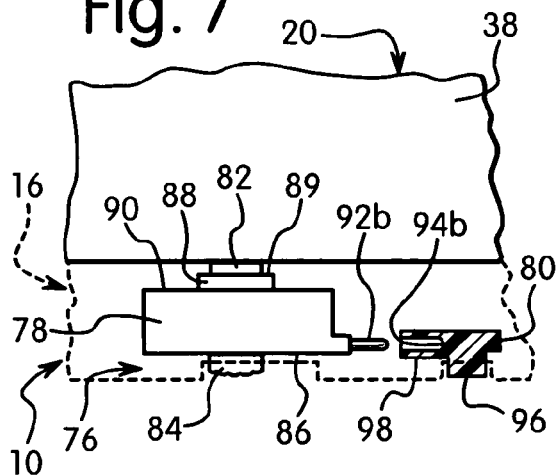
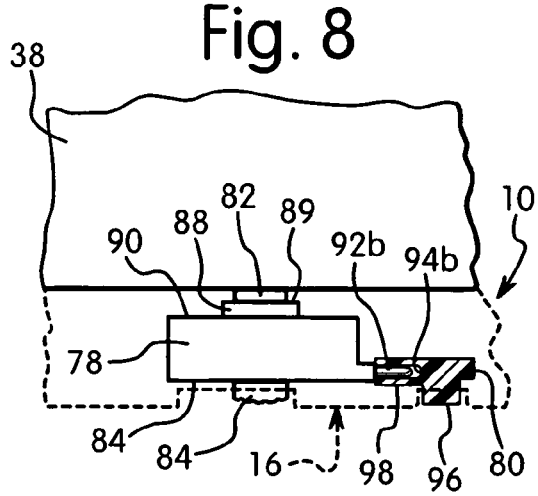
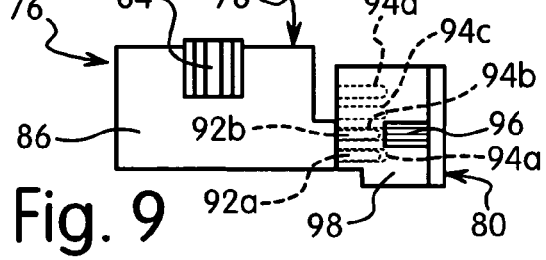
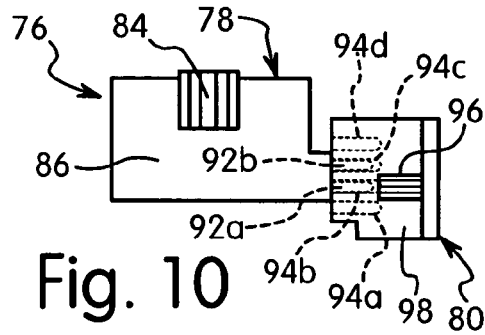
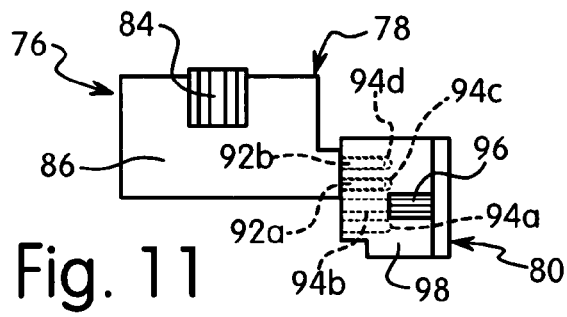
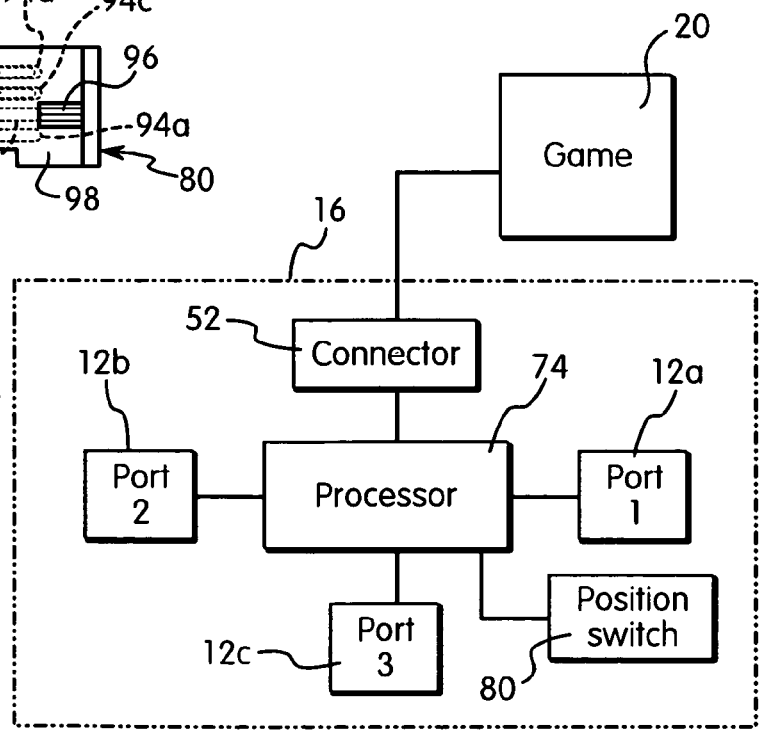

US 7,402,100 B2

HAND HELD ELECTRICAL DEVICE AND METHOD FOR USING THE SAME

FIELD OF THE INVENTION

The present invention relates to a hand held electronic device for a hand held electronic/video game, such as a GAMEBOY™ Advance SP. More specifically, the hand held electronic device of the present invention mechanically and electrically couples to the electronic game and provides multiple game cartridge ports allowing the player to choose between multiple games individually supported in each port.

BACKGROUND OF THE INVENTION

Most conventional hand held electronic games, such as a GAMEBOY™ or GAMEBOY™ Advance SP, typically accommodate only one game or game cartridge. These conventional electronic games include a single game cartridge port for receiving a single game cartridge selected by the player. This limits the player to a single game and requires the player to remove the game cartridge currently inserted into the port of the electronic game and insert a second or new game cartridge into the port in order to play a different game.

Examples of conventional electronic games and gaming systems include U.S. Pat. No. 6,530,570 to Ku; U.S. Pat. No. 6,042,478 to Ng; U.S. Pat. No. 5,984,784 to Ho; U.S. Pat. No. 5,114,157 to Kita; U.S. Pat. No. 4,596,390 to Studley; and U.S. Pat. No. 4,516,777 to Nikora, the subject matter of each of which is hereby incorporated by reference.

SUMMARY OF THE INVENTION

Accordingly, an object of the present invention is to provide a hand held electronic device that supports for multiple game cartridges and operably connects to a hand held electronic game.

Another object of the present invention is to provide a hand held electronic device that provides multiple games for a hand held electronic game that the player can select from without having to either switch game cartridges or modify the electronic game.

Yet another object of the present invention is to provide a hand held electronic device that adapts to a hand held electronic game and provides multiple games for the electronic game in a simple and inexpensive manner.

The foregoing objects are basically attained by a hand held electronic device that includes a main body with a connector adapted to electrically and mechanically connect the main body to an electronic game separate from the device. First and second ports of the main body are sized to receive first and second game cartridges of the electronic game, respectively. Each of the first and second ports have an electrical connection that is electrically connectable to the respective first and second game cartridges. The device includes a processor adapted to electrically connect the electronic game to the first and second game cartridges through the first and second ports of the main body.

The foregoing objects are also attained by a hand held electronic device that includes a main body with first and second opposite sides, and third and fourth opposite sides that extend between the first and second sides. A recessed portion of the main body is adapted to releasably receive a base of a separate electronic game. The recessed portion has a connector that connects to the base of the electronic game. First, second and third ports of the main body each have an access opening disposed in one of the first, second and third sides, respectively. Each of the first, second and third ports are adapted to receive a game cartridge of the electronic game and an electrical contact of each port providing electrical connection between the ports and the respective game cartridges. A processor is electrically connected to each of the first, second and third ports, and to the connector of the recessed portion so that the processor provides electrical connection between the electronic game and each of the first, second and third ports.

The foregoing objects are also attained by a method of selecting a single game cartridge from multiple game cartridges for playing with a hand held electronic game, comprising the steps of electrically connecting the hand held electronic game to a hand held electronic device separate from the hand held electronic game and electrically connecting first and second game cartridges of the hand held electronic game with first and second ports, respectively, of the hand held electronic device. The method also includes the steps of electrically connecting the first and second ports of the hand held electronic device to the hand held electronic game, selecting one of the first and second game cartridges, and playing the selected one of the first and second game cartridges with the hand held electronic game.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure:

FIG. 7 is a partial top plan view of the hand held electronic device and the electronic game illustrated in FIG. 1, showing a switch assembly of the electronic device including a power switch in the OFF position and a selection member in section and in a first position;

FIG. 8 is a partial top plan view similar to FIG. 7, showing power switch of the switch assembly in the ON position and the selection member of the switch assembly in the first position;

FIG. 9 is a side elevational view of the switch assembly illustrated in FIG. 8, showing the switch assembly in the first position;

FIG. 10 is a side elevational view of the switch assembly similar to FIG. 9, showing the switch assembly in a second position;

FIG. 11 is a side elevational view of the switch assembly similar to FIG. 9, showing the switch assembly in a third position; and FIG. 12 is a diagrammatic view of the hand held electronic device and electronic game illustrated in FIG. 1, showing the electrical connections between the electronic device and the electronic game.

DETAILED DESCRIPTION OF THE INVENTION

Referring to FIGS. 1-12, a hand held electronic device 10 in accordance with an embodiment of the present invention provides multiple game cartridge ports 12a, 12b and 12c for receiving multiple game cartridges 14a, 14b and 14c, respectively, (see FIG. 3) that can be played on a hand held electronic game 20, such as a conventional GAMEBOY™ or GAMEBOY™ Advance SP. Game cartridges 14a, 14b and 14c can be any type of game cartridge, such as compact discs, flash sticks, disks and the like. Game cartridges 14a, 14b and 14c are different games that are compatible with game 20. Electronic device 10 provides a multiple game adapter that supports multiple game cartridges, such as cartridges 14a, 14b and 14c, for playing with an existing electronic game, such as electronic game 20, that is simple and inexpensive, and does not require modification of the electronic game itself.

Figure 1:
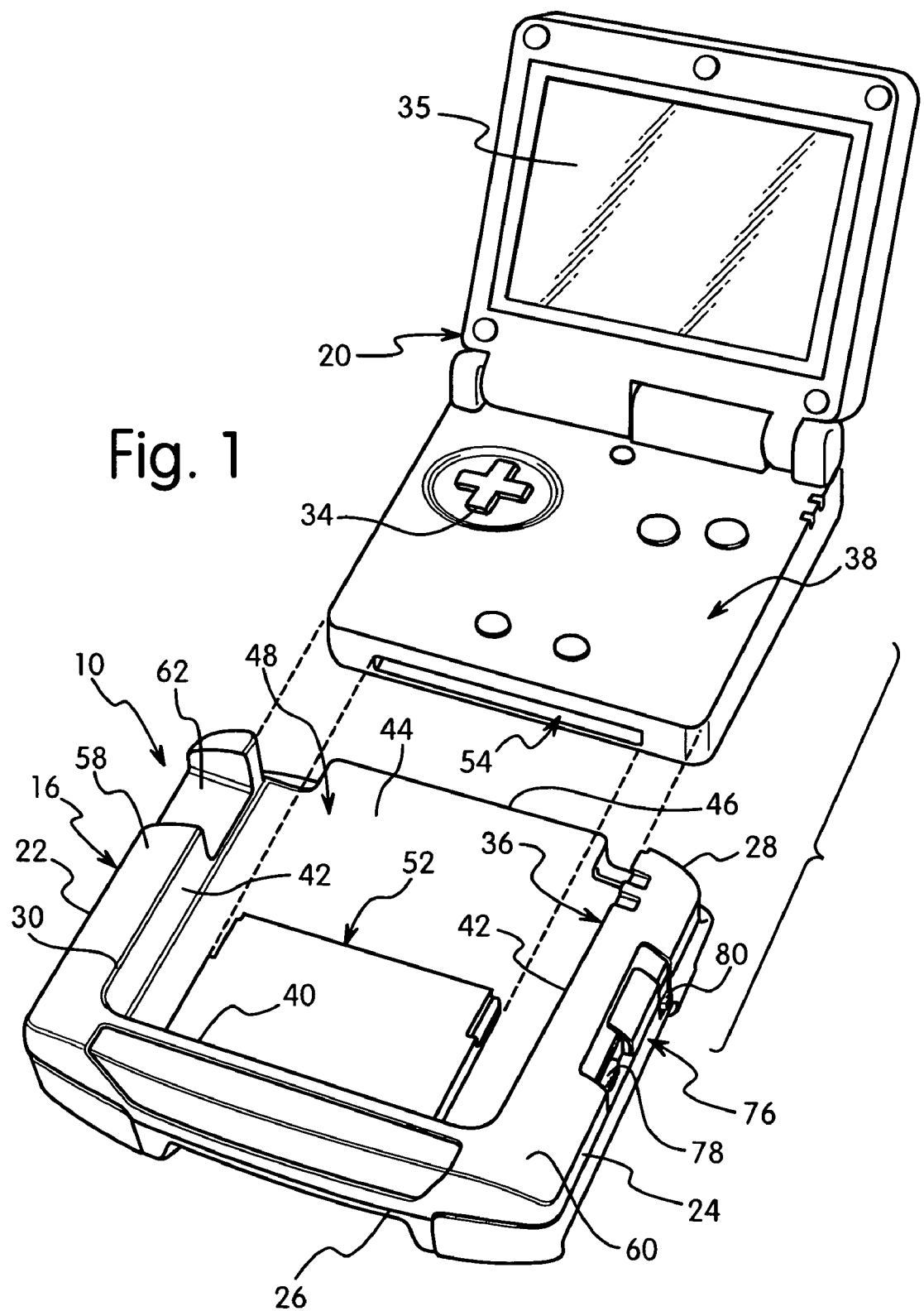
FIG. 1 is an exploded front perspective view of a hand held electronic device in accordance with a preferred embodiment of the present invention, showing a hand held electronic game being assembled with the electronic device.
Figure 2:
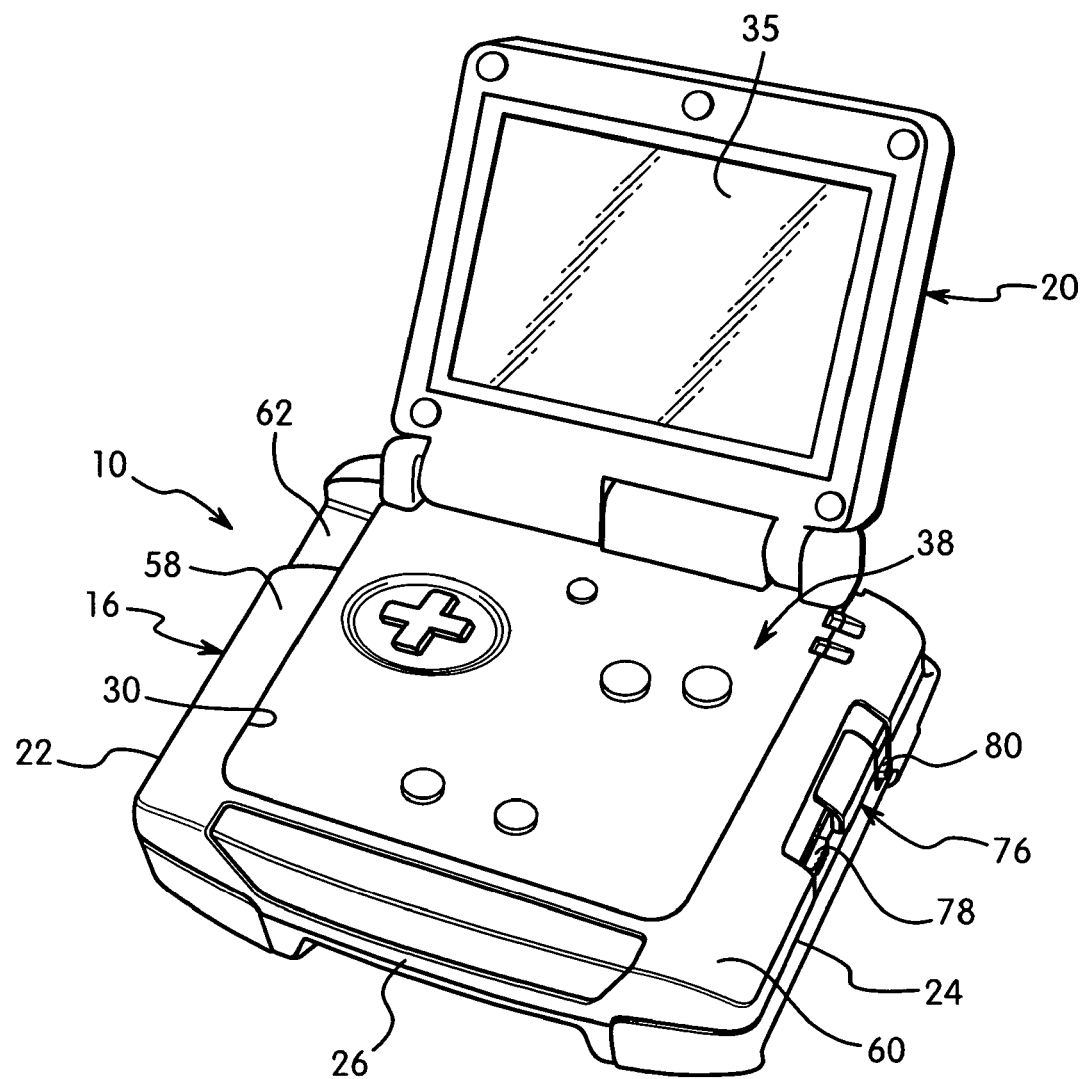
FIG. 2 is a front perspective view of the hand held electronic device illustrated in FIG. 1, showing the hand held electronic game assembled with the electronic device.
Figure 3:
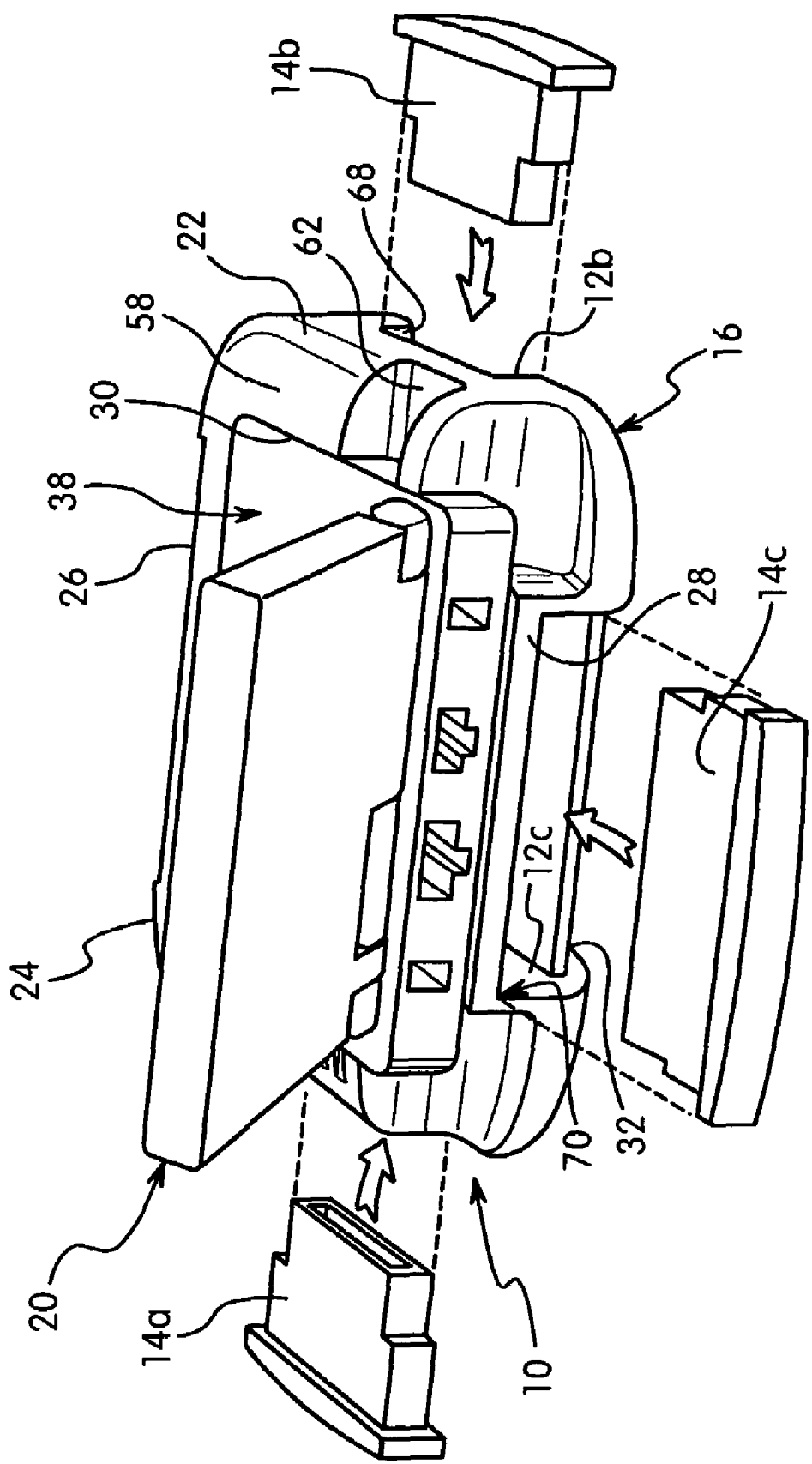
FIG. 3 is an exploded rear perspective view of the hand held electronic device illustrated in FIG. 2, showing game cartridges of the electronic game being inserted into ports of the electronic device.

Electronic device 10 includes a main body 16 that has left and right opposite sides 22 and 24 with front and rear sides 26 and 28 extending therebetween, and opposite top and bottom sides 30 and 32, as seen in FIGS. 1-3. The designations of left, right, front, rear, top and bottom are used only to facilitate description of the present invention and are not limiting as to the orientation of electronic device 10 or its components of device 10. Main body 16 includes a recessed portion 36 in top side 30 for receiving a portion of electronic game 20, as seen in FIG. 1. Recessed portion 36 preferably has a generally square shape and is sized and shaped to accommodate the base 38 of electronic game 20, as seen in FIG. 2. However, recessed portion 36 can have any shape as long as portion 36 can accommodate base 38 of game 20. Recessed portion 36 is defined by a front wall 40, opposite side walls 42, floor 44 and a free edge 46 opposite front wall 40. An insert opening 48 is defined at free edge 46 for inserting base 38 of game 20, as best seen in FIG. 1.

Figure 4:
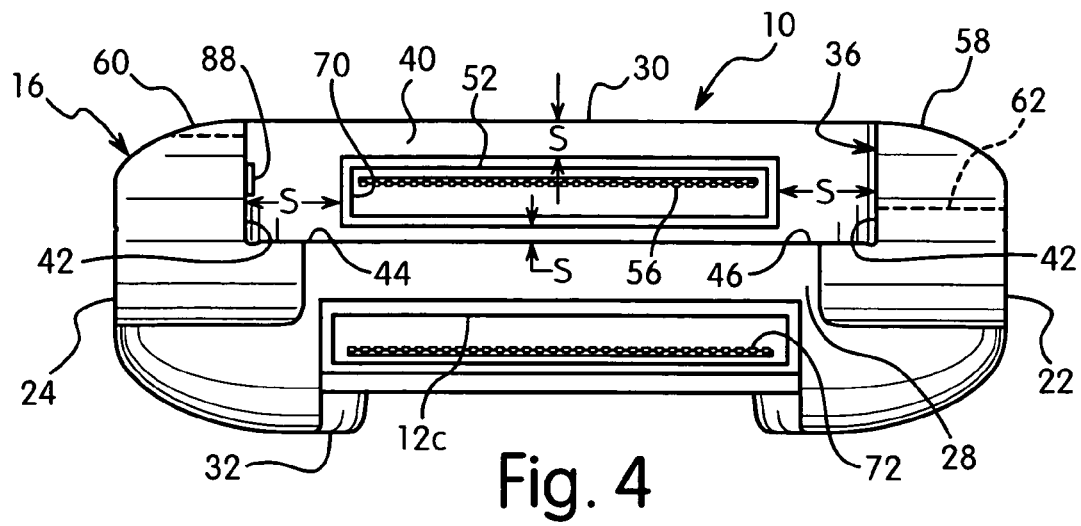
FIG. 4 is a rear elevational view of the hand held electronic device illustrated in FIG. 1, showing a port for receiving a game cartridge and a connector for coupling the electronic device to the electronic game.

A connector 52 extends inwardly into recessed portion 36 from front wall 40 for mechanically and electrically connecting device 10 to game 20. Connector 52 preferably has a shape similar to the conventional game cartridges 14a, 14b and 14c allowing connector 52 to be inserted into and received in the single game cartridge port 54 in the base 38 of game 20. However, connector 52 can have any shape as long as connector 52 can be received in port 54 of game base 38. An electrical connection or contacts 56 are disposed within connector 52, as best seen in FIG. 4, that are similar to the electrical contacts of the conventional game cartridges. Contacts 56 provide an electrical connection with game 20 via corresponding electrical contacts of port 54 of game 20. As seen in FIGS. 2 and 4, the spaces s between connector 52 and each of top 30, and side walls 42 and floor 44 of recessed portion 36, permit base 38 of game 20 to be received in recessed portion 36 with connector 52 received in port 54 of game 20.

First and second shoulders 58 and 60 of main body 16, respectively, border the side walls 42 of recessed portion 36, as seen in FIGS. 1 and 2. Shoulders 58 and 60 provide a gripping surface for the player. Bottom 32 of main body 16 can also provide a gripping surface, such as a cover layer of rubber material. A finger recess 62 is disposed in one of shoulder 58 and 60 for facilitating disengagement of base 38 from recessed portion 36, as best seen in FIGS. 2 and 5.

Figure 5:
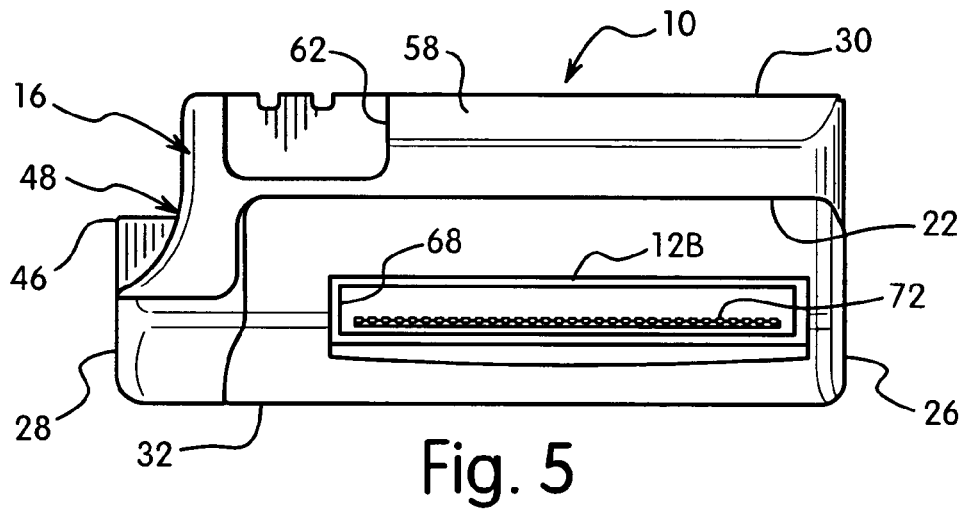
FIG. 5 is a side elevational view of the hand held electronic device illustrated in FIG. 1, showing another port for receiving a game cartridge.
Figure 6:
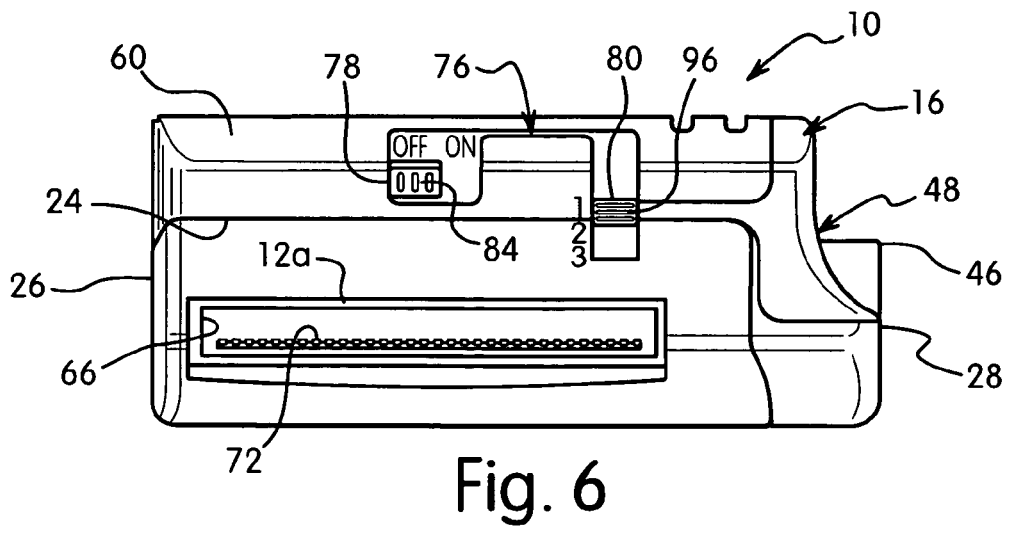
FIG. 6 is a side elevational view of the hand held electronic device opposite the view of FIG. 5, showing another port for receiving a game cartridge.

As seen in FIGS. 4-6, each of first, second and third game cartridge ports 12a, 12b and 12c are disposed in main body 16. First game cartridge port 12a includes a first access opening 66 disposed in right side 24 of main body 16, as seen in FIG. 6. Similarly, second and third game cartridge ports 12b and 12c include second and third access openings 68 and 70, respectively, as seen in FIGS. 4 and 5. Second access opening 68 of port 12b is disposed in left side 22 of main body 16 and third access opening 70 is disposed in rear side 28 of main body 16. Each port 12a, 12b and 12c is adapted to receive a respective game cartridge 14a, 14b and 14c in the same manner that a conventional game cartridge is received in port 24 of the conventional game 20. Ports 12a, 12b and 12c are sized to accommodate an individual game cartridge 14a, 14b and 14c, as seen in FIG. 3, and each includes an electrical connection, such as electrical contacts 72, for engaging corresponding electrical contacts of game cartridges 14a, 14b and 14c, as seen in FIGS. 4-6, thereby electrically connecting cartridges 14a, 14b and 14c to respective ports 12a, 12b and 12c. Although ports 12a, 12b and 12c are described as being oriented with respect to three different sides, respectively, of device 10, ports 12a, 12b and 12c can being oriented in any manner such as side-by-side or stacked one on top of the another. Also, although three ports 12a, 12b and 12c and three corresponding game cartridges 14a, 14b and 14c are described, device 10 can include any number of ports for supporting any number of game cartridges.

A processor, such as a microprocessor 74 (see FIG. 12), is disposed within main body 16 between top and bottom sides 30 and 32. Processor 74 controls the operation of electronic device 10 and is electrically connected to each port 12a, 12b and 12c and connector 52.

Positioned on either first or second shoulder 58 and 60 of main body 16 is a switch assembly 76 disposed opposite finger recess 62, as seen in FIG. 2, that includes a power switch 78 and a selection member 80. Power switch 78 turns electronic game 20 on and off by gripping and actuating the power switch 82 of game 20 once received in recess portion 36 of main body 16, as seen in FIGS. 7 and 8. As seen in FIGS. 7-11, power switch 78 of device 10 includes a finger grip 84 extending from an outer wall 86 thereof, a gripping member 88 extending from an inner wall 90 of switch 78, and an optional locking mechanism, such as pins 92a and 92b, extending from an end of switch 78 towards selection member 80 (FIGS. 7 and 8 show only pin 92b). Finger grip 84 may be a button that can be gripped by the player to laterally actuate power switch 78 between OFF and ON positions, as seen in FIG. 6 (showing switch 78 in the OFF position). Gripping member 88, as seen in FIGS. 4, 7 and 8, includes a gripping surface 89 that engages power switch 82 of game 20. Gripping surface 89 is formed of a material, such as rubber, that can frictionally engage game power switch 82. Any known engagement, including a frictional engagement, can be used to engage gripping member 88 and power switch 82 of game 20. For example, a snapping, pin and hole and the like engagement can be used.

Selection member 80 may be a position switch that can be gripped and actuated by the player between positions 1, 2 and 3, as seen in FIG. 6 (showing selection member 80 in position 1). Positions 1, 2 and 3 of selection member 80 correspond to ports 12a, 12b and 12c, respectively. Selection member 80 includes multiple holes 94a, 94b, 94c and 94d, as seen in FIGS. 9-11, for receiving locking pins 92a and 92b of power switch 78. A finger grip 96 extends outwardly from an outer wall 98 of selection member 80.

Assembly and Operation

Referring to FIGS. 1-12, electronic device 10 is assembled with electronic game 20 by inserting base 38 of game 20 through insert opening 36 toward front wall 40 of recessed portion 36 until base 38 is received in recessed portion 48. As base 38 of game 20 is being inserted into recessed portion 36, connector 52 of device 10 is received in game port 54, thereby mechanically and releasably connecting device 10 and game 20. Electrical contacts 54 of device connector 52 engage contacts (not shown) of port 54 of game 20 to electrically connect device 10 and game 20. Gripping member 88 of power switch 78 of device 10 engages power switch 82 of game 20 once game base 38 is received in recessed portion. More specifically, gripping surface 89 of member 88 frictionally engages a surface of power switch 82 of game 20, as seen in FIGS. 7 and 8, so that as power switch 78 of device 10 is moved, power switch 82 of game 20 also moves.

Game cartridges 14 are individually inserted into ports 12a, 12b and 12c, respectively, of device 10, through first, second and third access openings 66, 68 and 70, as seen in FIG. 3. Contacts 72 of each port 12a, 12b and 12c engage contacts (not shown) of respective game cartridges 14a, 14b and 14c, thereby electrically connecting ports 12a, 12b and 12c to game cartridges 14a, 14b and 14c.

Once game cartridges 14a, 14b and 14c are assembled with device 10 and device 10 is assembled with game 20, game cartridges 14a, 14b and 14c are electrically connected to game 20 via device 10, as seen in FIG. 12. Processor 74 of device 10 is electrically connected to each port 12a, 12b and 12c of device 10 which are in turn electrically connected to game cartridges 14a, 14b and 14c. Processor 74 is also electrically connected to connector 52 of device 10 which in turn is electrically connected to game 20, as seen in FIG. 12. This allows the player to select one of three games from game cartridges 14a, 14b and 14c to play with electronic game 20 using device 10.

The player can turn on game 20 using power switch 76 of device 10. Specifically, the player can grip finger grip 84 of power switch 78 and laterally move power switch 78 from the OFF position (FIG. 7) to the ON position (FIG. 8). Substantially simultaneously, gripping member 88 is frictionally engaged with power switch 82 of game 20 and moves game power switch 82 from the OFF (FIG. 7) position to the ON position (FIG. 8). The power source of electronic game 20, for example batteries, provides power for operating both the electronic game 20 and device 10.

The player can then choose a game between the games cartridges 14a, 14b and 14c inserted into ports 12a, 12b and 12c by moving selection member 80 to either position 1, 2 or 3. For example, by moving selection member 80 to position 1, port 12a and corresponding game cartridge 14a are selected by processor 74. The game cartridge 14a is then played with electronic game 20 in a conventional manner using the joysticks 34 and display screen 35 of game 20. Game cartridges 14b and 14c are selected and played in the same manner.

Locking mechanism such as locking pins 92a and 92b, is optionally provided to prevent the player from switching between game cartridges 14a, 14b and 14c via selection member 80 while power is still on. In particular, as power switch 78 is moved from the OFF position to the ON position, locking pins 92a and 92b of pins 78 selectively engage two of holes 94a, 94b, 94c and 94d of selection member 80. This requires the player to first move selection member 80 to the desired position, that is position 1, 2 or 3, to select a particular game cartridge 14a, 14b and 14c and then move power switch 78 from the OFF position to the ON position. For example, if the player moves selection member 80 to position 1 to select game cartridge 14a and then moves power switch 78 to the ON position, locking pins 92a and 92b will engage holes 94a and 94b of selection member 80, as seen in FIG. 9. Pins 92a and 92b and corresponding holes 94a and 94b prevent the player from moving selection member 80 to another position, such as positions 2 and 3. Power switch 78 must be moved to the OFF position, thereby disengaging pins 92a and 9b from holes 94a and 94b before the player can select a new game by moving selection member 80 to either position 2 or 3. Likewise, if the player selects position 2 for game cartridge 14b, pins 92a and 92b of position switch 78 will engage holes 94b and 94c of selection member 80, as seen in FIG. 10. Similarly, if the player selects position 3 for game cartridge 14c, pins 92a and 92b will engage holes 94c and 94d, as seen in FIG. 11. Any type of known releasable locking mechanism can be employed instead of locking mechanism pins 92a and 92c and holes 94a, 94b, 94c. Also, a locking mechanism, such as locking pins 92a and 92c and holes 94a, 94b, 94c and 94d, is not required. The locking mechanism cab be eliminated so that the player can move selection member 80 between position 1, 2 and 3 with power switch 78 in either the OFF or ON position.

To disengage game 20 from device 10, the player removes base 38 of game 20 from recessed portion 36 of device 10. Finger recess 62 can be used by the player to lift and move base 38, thereby facilitating removal of base 38 from recessed portion 36.

Electronic device 10 can be provided with software and a screen to provide an on screen display, that displays a menu, for example, that allows the player to select a game or game cartridge from multiple games listed on the screen. Device 10 can also be remote from game 20 with an adapter cable mechanically and electrically connecting device 10 and game 20 via a connector, such as connector 52 of device main body 16, and the game cartridge port 54 of game 20. For example, the player could wear the remote device 10 using a clip (not shown) with device 10. Alternatively, device 10 can communicate with game 20 via a wireless connection.

While a particular embodiment has been chosen to illustrate the invention, it will be understood by those skilled in the art that various changes and modifications can be made therein without departing from the scope of the invention as defined in the appended claims.

What is claimed is:

1. A hand held electronic device, comprising:
    a main body including a connector adapted to electrically and mechanically connect said main body to a second connector of a separable electronic game, first and second ports sized to receive first and second game cartridges of the electronic game, respectively, each of said first and second ports having an electrical connection that is electrically connectable to the respective first and second game cartridges, and a processor adapted to electrically connect the electronic game to the first and second game cartridges through said first and second ports, wherein the second connector of the separable electronic game is electrically and mechanically connectable to the first or second game cartridges.

2. A hand held electronic device according to claim 1, wherein
    said main body is adapted to receive a portion of the electronic game.

3. A hand held electronic device according to claim 2, wherein
said connector is adapted to be received in a portion of the electronic game.

4. A hand held electronic device according to claim 1, wherein
said main body includes a recessed portion adapted to receive a portion of the electronic game.

5. A hand held electronic device according to claim 4, wherein
said connector is disposed in said recessed portion of said main body.

6. A hand held electronic device according to claim 5, wherein
said connector is adapted to be received in a portion of the electronic game.

7. A hand held electronic device according to claim 1, wherein
said connector includes at least one electrical contact for electrically connecting to the electronic game.

8. A hand held electronic device according to claim 1, wherein
said connector is a extension member having a shape substantially identical to the game cartridges of the electronic game.

9. A hand held electronic device according to claim 1, wherein
said first and second ports define access openings in first and second sides of said main body.

10. A hand held electronic device according to claim 9, wherein
said first and second sides are substantially perpendicular to one another.

11. A hand held electronic device according to claim 9, wherein
said first and second sides are substantially parallel and opposite one another.

12. A hand held electronic device according to claim 1, wherein
each of said electrical connections of said first and second ports is an electrical contact.

13. A hand held electronic device according to claim 1, wherein
said main body includes a third port sized to receive a third game cartridge of the electronic game and having an electrical connection for electrically connecting to the third game cartridge.

14. A hand held electronic device according to claim 1, wherein
a selection member is electrically connected to said processor and includes at least first and second selectable positions corresponding to said first and second ports, respectively, said selection member communicates to said processor when said selection member is in said first and second positions.

15. A hand held electronic device according to claim 14, wherein
said selection member is a switch.

16. A hand held electronic device according to claim 1, wherein
the electronic game is a hand held electronic game.

17. A hand held electronic device, comprising:
a main body including:
first and second opposite sides, and third and fourth opposite sides extending between said first and second sides,
a recessed portion adapted to releasably receive a base of a separate electronic game, said recessed portion having a connector connectable to the base of the electronic game,
first, second and third ports each having an access opening disposed in one of said first, second and third sides, respectively, each of said first, second and third ports being adapted to receive a game cartridge of the electronic game and an electrical contact of each port providing electrical connection between said ports and the respective game cartridges, and
a processor electrically connected to each of said first, second and third ports, and said connector of said recessed portion,
whereby said processor provides electrical connection between the electronic game and each of said first, second and third ports.

18. A hand held electronic device according to claim 17, wherein
said connector is adapted to be received in the base of the electronic game and includes an electrical contact for electrically connecting to the electronic game.

19. A hand held electronic device according to claim 17, wherein
said connector is an extension member having a shape substantially identical to the game cartridges of the electronic game.

20. A hand held electronic device according to claim 17, wherein
a selection member is electrically connected to said processor and includes first, second and third positions corresponding to said first, second and third ports, respectively, said selection member being adapted to communicate to said processor when said selection member is in each of said first, second and third positions.

21. A hand held electronic device according to claim 20, wherein
said selection member is a position switch disposed on one of said first, second and third sides of said main body.

22. A hand held electronic device according to claim 20, wherein
said main body includes a power switch; and said power switch includes locking pins that engage said position switch when said power switch is in an on position.

23. A hand held electronic device according to claim 17, wherein
said main body includes gripping portions at said first and second sides for facilitating gripping of said main body.

24. A hand held electronic device according to claim 17, wherein
said main body includes a finger recess disposed in one of said first, second, third and fourth sides for facilitation disengagement of the electronic game from said main body.

25. A method of selecting a single game cartridge from multiple game cartridges for playing with a hand held electronic game, comprising the steps of:
electrically connecting the hand held electronic game to a hand held electronic device separate from the hand held electronic game, the hand held electronic device connecting to a connector of the handheld electronic game;
electrically connecting first and second game cartridges of the hand held electronic game with first and second ports, respectively, of the hand held electronic device, wherein the first or second game cartridge can be mated with the connector of the handheld electronic device;

electrically connecting the first and second ports of the hand held electronic device to the hand held electronic game;

selecting one of the first and second game cartridges; and playing the selected one of the first and second game cartridges with the hand held electronic game.

26. A method according to claim 25, further comprising the step of:

inserting the first and second game cartridges into the first and second ports, respectively, of the hand held electronic device.

27. A method according to claim 25, further comprising the step of:

electrically connecting a third game cartridge of the hand held electronic game to the hand held electronic device.

28. A method according to claim 25, further comprising the step of:

coupling a portion of the hand held electronic game to the hand held electronic device.

29. A method according to claim 25, further comprising the step of:

coupling a portion of the hand held electronic device to the hand held electronic game.

30. A method according to claim 25, further comprising the step of:

actuating a switch on the hand held electronic device for selecting one of the first and second game cartridges.

31. A hand held electronic device, comprising:

a main body including:
- a connector adapted to electrically and mechanically connect the main body to a separable electronic game,
- a first communications device configured to communicate with a first game storage device, the first game storage device storing a first game of the electronic game,
- a second communications devices configured to communicate with a second game storage device, the second game storage device storing a second game of the electronic game, and
- a processor adapted to establish a communications link between the electronic game and the first game storage device or the second game storage device.

32. The hand held electronic device of claim 31, wherein the first communications device includes a port, wherein the first game storage device is configured to mate with the port.

* * * * *